United States Patent Office 2,819,981
Patented Jan. 14, 1958

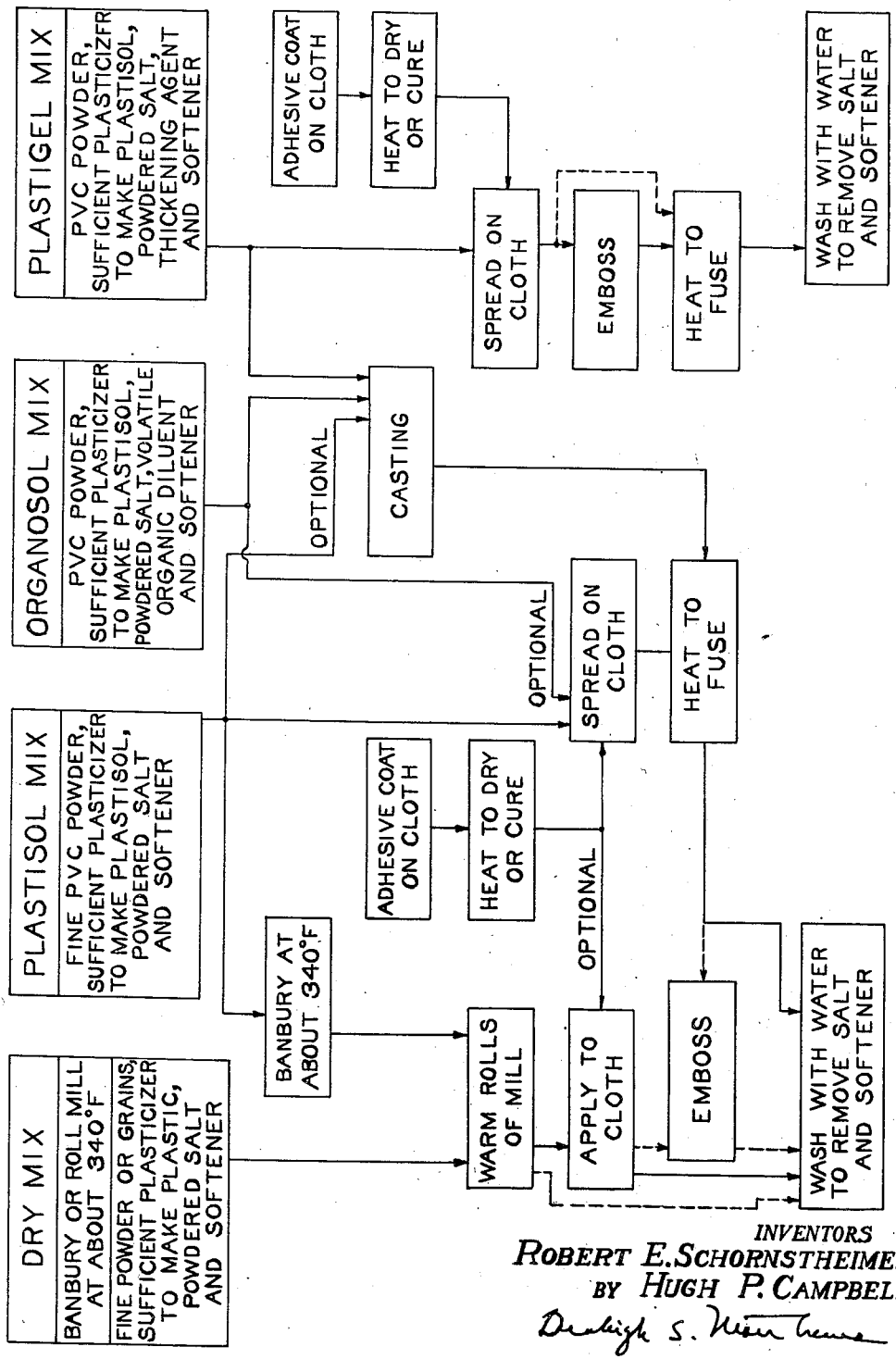

2,819,981

METHOD FOR MAKING FLEXIBLE, VAPOR-PERMEABLE, WATER-RESISTANT VINYL FILMS AND THE LIKE HAVING IMPROVED SLIP AND HAND

Robert E. Schornstheimer and Hugh P. Campbell, Marietta, Ohio, assignors to The B. F. Goodrich Company, New York, N. Y., a corporation of New York Application February 23, 1955, Serial No. 490,142

12 Claims. (Cl. 117—11)

This invention relates to a method of making plastic films, sheets and the like. More specifically, it relates to a method for obtaining a flexible, vapor-permeable, water-resistant thermoplastic coated fabric having excellent "hand" and "slip."

Plastics such as polyvinyl chloride and the like have excellent wearing properties, lend themselves well to various colors and to embossing to create novel designs, and can easily be cleaned. However, when they are used as coatings or films on fabric bases to make upholstery material for furniture, automobiles and the like, it has been found that the films which are nonporous trap water, or moisture condenses on their surface, so that they tend to stick to the individual who comes in contact with them or cause the individual's clothes to adhere to his skin. Accordingly, such materials are uncomfortable. If holes are punched in the vinyl sheet of vinyl-coated fabric by mechanical or electrical means, they are necessarily so large that water will pass through the film, detract from the appearance of the vinyl and tend to be dirt catchers. The means to make the holes may also injure the base. Such factors seriously limit the uses of vinyl films and vinyl-coated fabrics where any appreciable amount of moisture vapor may condense on the surface.

On the other hand as shown in copending application of Donald V. Sarbach, Serial No. 447,857, filed August 4, 1954, and entitled "Article of Manufacture Containing Plastic and Method for Making the Same," it is known that very useful vinyl films and vinyl coated fabrics can be obtained by incorporating into the vinyl mixture a powdered or finely-divided nonhygroscopic pore-forming material soluble in a nonsolvent for the polymeric composition. After fusing, the polymer can then be washed to remove the nonhygroscopic material to provide a water-resistant vapor permeable vinyl polymer film or coated fabric. These breathable films or coated fabrics are also washable and dirt resistant and do not tend to stick to the individual who comes in contact with it nor to cause clothes to stick to the individual. In processing such vinyl compounds with the powdered or finely-divided nonhygroscopic pore-forming material on a rubber or plastic calender, the operation is difficult unless more plasticizer is used than is desired to obtain a finished vinyl product with the required hand and slip characteristics after the pore former is washed out. The coating after washing is somewhat soft and clothing does not slip freely across its surface. "Hand" is a term used in the upholstery industry and refers to the relative softness, stiffness, flexibility, etc., of a material as it feels to the hand. "Slip" is another term used in the upholstery industry and refers to the ease or difficulty with which clothing slips over the surface of a material.

In other words, for many applications especially in the upholstery industry it is preferred to have material with the proper "hand" and "slip" but due to the fact that it is difficult to process the vinyl containing the pore-forming element, excess plasticizer is used making the finally fused vinyl coating too soft to give the best "hand" and "slip." If the amount of the plasticizer is reduced to improve the slip and hand, the polymeric composition becomes difficult to mix, calender, laminate or spread coat so that processing costs are increased. Moreover, if the surface of the polymeric film or coating is given a top coat of the same or other polymer to improve its appearance and feel, additional costs are involved in the extra processing steps and material that are required.

Hence, it is a primary object of the present invention to avoid the difficulties alluded to hereinbefore and to provide a method for producing a water-resistant, vapor-permeable polymeric film with improved "hand" and "slip."

It is another object of this invention to provide a method for producing a thermoplastic polymeric resin-coated fabric base which is flexible, water-resistant, vapor-permeable and wherein said coating exhibits excellent "hand" and "slip" and is adherent to the base.

These and other objects and advantages of the present invention will become more apparent to those skilled in the art from the following detailed description and example.

According to the present invention it has been discovered that a vapor permeable, water-resistant flexible coating or film of a plasticized polymeric material having excellent "hand" and "slip" can now be obtained by incorporating a minor amount of a softener, soluble in a nonsolvent for the polymeric material, as a replacement for part of or in addition to the plasticizer in a composition comprising the polymeric material, the plasticizer, and a pore-forming material prior to calendering or casting. The composition can then be cast or calendered, fused, embossed if desired, and treated with a solvent to remove the softener and pore-forming material. Clothing slips readily across the surface of the resulting coating or film. Air can easily pass through the film. However, water does not readily, if at all, penetrate the film which actually can withstand a hydrostatic head of up to 35" or more of water. The films or layers are very abrasion-resistant and their surfaces are relatively hard. They also can be deposited as plasticized composition coatings on supporting bases or webs to form adherent flexible water-resistant, vapor-permeable laminates having slick and shiny polymeric coatings.

The softener used in the present composition is soluble in a solvent which is a nonsolvent for the polymeric material and its plasticizer. It also is compatible in the plasticized polymeric pore-forming composition so that the composition can readily be mixed, calendered, laminated, formed into plastisols, embossed and the like yet can readily be removed by the solvent without detracting from the properties of the plasticized polymer. A feature of the use of the softening agent is that since it is removed by a solvent it can replace part of the pore-forming material with retention of the desired vapor permeability and resistance to penetration by water. Examples of suitable softeners for use in the compositions disclosed herein are the alkylene carbonates and the polyalkylene glycols. Specific examples of such compounds are ethylene carbonate, propylene carbonate, butylene carbonate, polyethylene glycol, polypropylene glycol and the like. Mixtures of the softeners can be used. The alkylene carbonates can be made by reacting 2 mols of an alkylene alcohol or its sodium derivative with a material such as phosgene. For example, 2H$_2$C=CH—CH$_2$ONa + COCl$_2$ ⟶

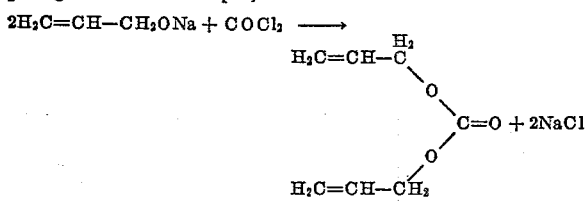

Polyalkylene glycols have the general formula

HOCH$_2$(CH$_2$OCH$_2$)$_x$·CH$_2$OH where $x$ is an integer. They have various molecular weights. For example, one member of the series can be prepared by condensing 2 mols of the monosodium salt of diethylene glycol with 1 mol of B,B'-dichloroethyl ether to give hexaethylene glycol dichloride which is condensed with 2 mols of the monopotassium salt of hexaethylene glycol yielding an 18 membered compound. Polyalkylene glycols of even higher polymer numbers can be made and are known to the art. Other methods for making the carbonates and glycols discussed above can be employed. Moreover, other softeners exhibiting the aforementioned properties can be used in the polymeric materials disclosed herein.

Very minor amounts of the softener, as compared to the plasticizer, afford some improvement in the processability of the composition and in the appearance and feel of the resulting breathable film. However, for best results it is preferred to use a total amount of from about 5 to 30% by weight of the softener based on the total weight of the softener and plasticizer in the composition. Very large amounts of the softener are not desired for after washing or extraction of the softener from the film, the flexibility and elasticity of the film are too low.

The softener can be added to a plastisol, organosol or plastigel composition of the polymer prior to or after adding the pore-forming material. Likewise when using a Banbury or a roll mill the softener can be added to the polymer prior to, at the same time, or after the plasticizer, pore-forming material and other compounding ingredients have been added.

The polymeric material used in practice of the present invention includes all of the haloethylene polymers composed predominantly of a polymerized haloethylene having from one to two halogen atoms attached to only one of the carbon atoms, such as homopolymers of vinyl chloride, vinyl bromide, vinyl fluoride, vinylidene chloride, vinylidene bromide, vinylidene fluoride and the like, and interpolymers or copolymers of two or more of these monomers. Copolymers or interpolymers made from monomeric mixtures containing at least one haloethylene monomer together with a lesser amount of one or more copolymerizable monoolefinic monomers can also be employed. Monoolefinic materials which can be co- or interpolymerized with the haloethylene monomers include vinyl esters such as vinyl acetate, vinyl chloroacetate, vinyl propionate, vinyl chloropropionate, vinyl butyrate, vinyl benzoate, vinyl chlorobenzoate, and others; acrylic and alpha-alkyl acrylic acids, their alkyl esters, their amides and their nitriles such as acrylic acid, chloroacrylic acid, methacrylic acid, ethacrylic acid, methyl arylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; vinyl aromatic compounds such as styrene, dichlorostyrene, vinyl naphthalene and others; alkyl esters of fumaric and maleic acids such as dimethyl maleate, diethyl maleate, and others; vinyl alkyl ethers and ketones such as vinyl methyl ether, vinyl ethyl ether, vinyl isobutyl ether, 2-chloro-ethyl vinyl ether, methyl vinyl ketone, ethyl vinyl ketone, isobutyl vinyl ketone, etc.; and in addition other monoolefinic materials such as ethyl methylene malonate, ethylene, isobutylene, trichloroethylene, vinyl pyridine, N-vinyl carbazole, N-vinyl pyrrolidone, and various other readily polymerizable compounds containing a single olefinic double bond, especially those containing the CH$_2$=C< group. When utilizing interpolymers or copolymers, the proportions of the various monomers in the monomeric mixtures polymerized to give the interpolymer may be varied considerably as long as the haloethylene monomer constitutes at least 50% by weight of the total. For example, there may be used copolymers of from 50 to 99%, preferably from 70 to 95%, by weight of the haloethylene monomer, together with from 1 to 50%, preferably from 5 to 30%, by weight of a vinyl ester, or an acrylic or methacrylic ester or any of the other monoolefinic materials mentioned above, or any two, three, four, or more of these. Tripolymers of from 50 to 90% by weight of vinyl chloride, from 5 to 45% by weight of vinylidene chloride, and from 5 to 45% by weight of a vinyl ester such as vinyl acetate or vinyl benzoate, or an acrylic or methacrylic ester are examples of vinyl halide polymers which may be used. Of the various polymers disclosed herein, those composed of a vinyl halide, especially vinyl chloride, and of a predominant amount of a vinyl halide and of a minor amount of a vinylidene halide, especially copolymers of a predominant amount of vinyl chloride and a minor amount of vinylidene chloride, and blends of these polymers and copolymers are preferred. Blends or mixtures of the homopolymers, copolymers and interpolymers can also be used. Where the haloethylene polymer is to be calendered onto the fabric base, the polymer prior to mixing with plasticizer may be in the form of pellets, granules or powder. However, when making plastisols and the like used for spread coating, the polymer should be in the form of powder and may be porous.

Examples of suitable plasticizers for the haloethylene polymers are butyl benzyl phthalate, dicapryl phthalate, dioctyl adipate, dioctyl azelate, dioctyl sebacate, dioctyl phthalate, dibutyl phthalate, dibutoxy ethyl phthalate, dibutyl sebacate, octyl diphenyl phosphate, tricresyl phosphate, tributoxyethyl phosphate, or mixtures thereof. Other plasticizers which can be employed are hexachlorodiphenyl oxide, toluene sulfonamide-aldehyde resin, and a composition comprising a water-insoluble thermoplastic cellulose ether, di(4-tertiary butyl phenyl) monophenyl phosphate and di(4-tertiary butyl phenyl) mono(5-tertiary butyl-2-xenyl) phosphate. Still other plasticizers for haloethylene containing polymers well known to the art can be used.

The total amount of plasticizer and softener used in the composition will vary from about 30 to 200 parts by weight per 100 parts by weight of the polymeric material. The resulting unfused compositions containing also the pore-forming material will be in the form of dry pourable powders or pourable liquid masses. On fusing, flexible, relatively hard (as compared to compositions having a higher plasticizer content), films or coatings with desired slip and hand characteristics will be obtained. It however, is preferred to employ a total of from about 50 to 100 parts by weight of plasticizer and softener for each 100 parts of the polymeric material present, especially where a calender mix is to be laminated onto a fabric base and later embossed to which the present invention is particularly directed. When making a calender mix the softener, plasticizer and polymeric material may be mixed in a Banbury or other suitable mixer and the temperature may go above the gel point and as high as about 340° F. while, when making plastisols, the temperature during mixing should be below the gel point and preferably not above room temperature, about 25° C., to provide a liquid composition having a viscosity of from 200 to 40,000 centipoises and up to 130,000 centipoises.

Plastigels are prepared by adding a minor amount of a thickening agent such as a metallic soap (aluminum distearate, calcium stearate, lithium distearate, lithium hydroxy stearate, magnesium stearate, sodium stearate or mixtures thereof) to the plastisol compositions described above. Generally, 5 to 10 parts by weight of said soap are used for every 100 parts by weight of plastisol. The plastigels are putty-like masses and retain their form when embossed and after embossing can be fused at a temperature of from about 300 to 400° F. It will be understood that a minor amount of the soap used in forming plastigels may come out of the plastic when it is washed with a solvent such as water to remove the softener and pore-forming material. However, a major amount of the soap remains in the plastic so that water may be considered a nonsolvent in such cases for the thickening agent.

Organosols are obtained by adding a minor amount, 10 to 50% by weight based on the weight of the plastisol, of a volatile organic diluent such as mineral spirits, toluene, and the like and mixtures thereof to the above described plastisol composition or by replacing part of the plasticizer with diluent. Organosols are more fluid than plastisols and are desirable to use where increased fluidity is needed or where some penetration of the fabric base is indicated.

The pore-forming material should be nonhygroscopic and insoluble or only sparing soluble in the polymer, plasticizer and other compounding ingredients but should be soluble in a nonsolvent for the polymer, plasticizer and other compounding ingredients. Moreover, it should be a solid and not melt, soften, decompose or react in the polymeric composition at fusing or embossing temperatures. Materials found useful as pore-formers are the alkaline halide salts such as ammonium chloride, sodium chloride, potassium chloride, sodium bromide, potassium bromide, and the like and mixtures thereof which are readily soluble in water which is essentially a nonsolvent for the polymeric composition. Other materials exhibiting the aforementioned properties can likewise be used in the practice of the present invention. The nonhygroscopic material may be added to the polymer-plasticizer-softener mix in the Banbury or to the mix on the mill rolls if mill mixing is used. It also can be mixed with the plastisol, plastigel or organosol during formation of these compositions or after they have been formed taking care to avoid raising the temperature much above room temperature, as in the case of the plastisols, to avoid gelling.

The nonhygroscopic, pore-forming material should be in a finely-divided or powdered condition to provide after removal from the polymer very small pores or a microporous structure in which substantially all, or all of the pores are interconnecting. Preferably essentially all of the particles should pass through about a 65 mesh USS screen and a predominant amount through about a 100 mesh USS screen. While particles of a somewhat larger size can be employed, they should not be in chunk form or of a granulated size since the structure formed is too porous and will not retain a static head of water. Moreover, a film or sheet having large pores does not present a continuous, smooth and uninterrupted surface as is exhibited by the product of the present invention where the pores in the film are just barely visible to the naked eye when looking at the cut edge of the film. Furthermore, large pores tend to collect and retain dust, dirt, and the like. On the other hand, somewhat smaller mesh size salt can be used but it should not be very substantially finer than that shown above to avoid loss of vapor permeability. The amount of pore-forming material will vary from about 50 to 300% by weight based on the weight of the polymer in the composition. Larger or smaller amounts of the pore former are undesirable as such tend to decrease vapor permeability or lower water resistance.

The polymeric haloethylene compositions disclosed herein may also contain minor amounts of one or more stabilizers such as the alkaline earth silicates, basic lead carbonate, barium ricinoleate, lead oxide, lead silicate, lead stearate, lead phenolate, titanium dioxide, and the like. Desirably such stabilizers are used in an amount of from 0.1 to 10 parts by weight per 100 parts by weight of the haloethylene polymer.

Other compounding ingredients may also be incorporated in the haloethylene polymer or polymer composition such as fillers, dyes and color pigments, herbicides, fermicides, fungicides, minor amounts of rubbery butadiene-1,3 and acrylonitrile copolymers, and the like. Detergents such as Sotex CW (compounds of long-chain fatty acid esters of multiple ether amine linkages), Santomerse S (salts of substituted aromatic sulfonic acids), Aerosol 18 (N-octadecyl disodium sulfosuccinamate), and the like, in amounts of from 0.5 to 5 parts by weight per 100 parts of polymer may be added to the composition.

The porous web or fabric base which is desirably used to support the polymer is preferably constructed of the open-weave type which is capable of elongation, such as netting, although other weaves such as drill, twill and the like may be used. Weftless fabric as well as unwoven materials, i. e., matted materials, may also be used. While sized fabric can be used, it is preferred to employ unsized fabric. The fabric itself may be of cotton, wool, or other natural fibrous materials, paper, synthetic fibers, or mixtures thereof, which are capable of withstanding the fusing temperatures of haloethylene polymers without appreciably losing their shape, strength and the like.

If desired, the fabric can first be treated with an adhesive (about 1 ounce per square yard) and dried to provide increased adhesion between the polymer and the fabric base although satisfactory adherence has been obtained without using adhesives. Where plastisols and organosols are employed, an adhesive-coated base fabric is desired to reduce penetration of plasticized polymer into and between the interstices of the cloth and to reduce stiffening of the finally obtained laminate. Examples of suitable adhesives are plasticized polyvinyl chloride latices, latices of mixtures of copolymers of butadiene-1,3 and acrylonitrile and polyvinyl chloride, and the like.

The solvent used to remove the softener can be any solvent which will dissolve, extract or remove the softener without dissolving or essentially dissolving out the polymeric material, its plasticizer and other necessary compounding ingredients. The solvent used may also be the same as the solvent employed for removal of the poreforming material so that dissolving out, extracting or washing out the softener and pore-forming material can be accomplished in one step. Water has been found to be an admirable substance for use as a solvent since it removes the softener and pore former at the same time. However, other solvents can be used to remove both the softener and pore former, or each one separately, before or after the other. Mixtures of solvents can be employed.

The solvent used to remove the softener and pore-forming material also can contain from about 0.01 to .50% by weight of a detergent or other material to increase the wettability of the solvent for the softener and pore-forming material contained in the polymer composition. The time of washing may vary from a few minutes to several hours or more depending on the amount of softener and pore-forming material, thickness of coating, degree of agitation, method of washing, etc. After washing, the sheet or laminate may be dried in air at room temperature or heated in an oven at a temperature of from about 100-175° F. or higher. The wash water remaining after washing can be heated to evaporate the water, or it can be flashed, and the pore former and softener recovered for further use. They can be separated by heating to a temperature sufficient to melt the softener which then can be removed easily from the pore former especially where it is a material such as salt or NaCl.

Several methods may be used to prepare water-resistant, vapor-permeable plastic polymeric haloethylene coated fabrics as shown in the accompanying drawing which is a flow sheet illustrating the sequence of successive steps which may be followed in practicing the present invention. For example, the polymeric material in dry powder or granular form is mixed with sufficient plasticizer to plasticize the polymer, softener and pore former in a Banbury or other mixer at about 340° F., warmed on rolls, applied to cloth, preferably heated, by calendering and laminating at about 250°–500° F. and washed to remove the softener and pore formed. If it is desired to provide a design on the surface of the polymer, the hot polymer-coated fabric may be passed through embossing rolls prior to washing. If the polymer has cooled, it can be reheated and embossed. It is much preferred to emboss prior to washing to avoid closing the pores of the polymer under the design of the embossing roll. Instead of using a dry powdered or granular polymer, the Banbury may be charged with a plastisol. Plastigels or organosols may also be charged to the Banbury but they offer little advantage as they are more economically spread onto the fabric. Moreover, both sides of the fabric may be coated and additional polymer coatings may be applied to the polymer coating on the fabric base if deemed necessary by using any one of the procedures disclosed herein.

Other methods of applying the polymeric composition to the fabric base may also be used. For example, the composition is calendered and the fabric is run between the last two rolls of the calender machine with the composition banked onto the fabric. Or, the composition is calendered and the fabric is run over a rubber laminating roll which laminates the fabric to the sheet on the last roll of the calender. Still another process is to calender a sheet of the composition and feed the composition sheet to a separate laminator where the composition sheet and fabric are laminated together between the two pressure rolls of the laminator.

In spread coating the fabric base, a plastisol is generally used although plastigels or organosols may also be employed. The plastisol mix is cast, roller coated or spread on the fabric base, heated to gel and fuse and washed to remove the softener and pore former. Embossing of the polymer-coated fabric, if desired, should precede washing. If a thinner composition is desired, an organosol can be used and sufficient time should be allowed during the heating step to permit evaporation of the diluent from the organosol. Additional equipment to carry off the vapors of the diluent or to prevent explosions or fires may be required when using the organosol composition.

Moreover, plastisols or organosols can be cast or spread as a film or sheet onto a belt of stainless steel or other material to which it will not adhere readily. A fabric web is then laminated to the cast film before or after fusing. After fusing the film, the laminate is readily stripped from the belt and washed. Alternatively, the plastisol or organosol can be cast onto such a belt, fused, cooled, stripped off the belt and laminated or cemented to the fabric base and washed. Or, the fused film can be washed and then cemented to the base.

The plastigel mix is prepared and handled in much the same way as the plastisol composition. It is spread onto the fabric base and embossed or a design pressed on its surface, fused, and washed to remove the softener and pore former. Alternatively, the embossing or pressing step can be omitted although the use of embossing prior to fusing is a feature of the use of plastigels which retain their form when embossed. Moreover, embossing may follow the fusing or washing steps but such procedure is not too desirable.

While the foregoing comments have largely been directed to vapor-permeable water-resistant haloethylene polymer coatings or films laminated to a supporting fabric base, it will be understood that useful slick and shiny vapor-permeable and water-resistant films, sheets and the like of haloethylene polymers of the proper hardness for good hand and slip characteristics can be obtained which are unsupported. They can be prepared by calendering, casting or spread coating the polymer mix on a belt such as stainless steel. After setting or fusing the polymer, it can be stripped from the base material such as a stainless steel belt and washed or cooled and washed.

The slick and shiny fused polymeric films and coatings obtained according to the present invention are about .010 to .030″ thick. Thinner or thicker films and coatings can of course be obtained by varying the spacing between the calender rolls or the amount of plastisol, etc., used. However, very thin coatings are not desirable as they may result in loss of strength while very thick coatings are not too desirable as they tend to reduce moisture vapor transmission. The films, coatings and laminated fabrics of the present invention are flexible, water-resistant and vapor-permeable. The water vapor transmission of the fused polymer will vary from about 50 to 200 grams $H_2O/100$ in.$^2$/24 hrs. and the hydrostatic pressure (Suter) will vary from about 15 to 35 in. $H_2O$. The abrasion resistance index (using double rubs with sandpaper) of the film will be from 2,000 to 8,000. The fused polymeric films and laminates are easy to wash and do not hold dirt or other foreign matter and can be embossed, preferably prior to removal of the softener and pore former, to stimulate leather, special fabric weaves, etc. In addition to embossing, the material can be printed with decorative or leather-like designs, etc., and can be top-coated by printing, spraying, spreading or roller coating to improve slip, hand, and abrasion resistance without appreciably detracting from its vapor permeability either before or after washing out the softener and pore former. Such procedures also do not adversely affect the ease of washing out the softener and pore former. However, an important feature of the present invention is the obtainment of results equal to or better than those achieved with top coating so that this step is unnecessary and undesirable.

The following example will serve to illustrate the invention with more particularity to those skilled in the art:

Plasticized compositions were prepared by mixing the ingredients listed below in a laboratory pony mixer, banburying and milling to consistency:

| Material | Parts by weight | | | |
|---|---|---|---|---|
| | "A" | "B" | "C" | "D" |
| Powdered polyvinyl chloride (average mol. wt., 58,000) | 100 | 100 | 100 | 100 |
| Dioctyl phthalate | 20 | 18 | 17 | 17 |
| Santicizer 141 (alkyl aryl phosphate plasticizer) | 20 | 17 | 17 | 17 |
| Dioctyl adipate | 20 | 17 | 16 | 16 |
| Stabilizer and lubricant paste | .04 | .04 | .04 | .04 |
| Antimony oxide | .02 | .02 | .02 | .02 |
| Flaked salt | 219 | 208 | 219 | 219 |
| Green color paste | 2 | | | |
| Blue color paste | | 2 | | |
| Yellow color paste | | | 2 | |
| Rose color paste | | | | 2 |
| Polypropylene glycol (Dow P750) | | | 10 | |
| Propylene carbonate | | | | 10 |

The USS screen size of the salt was as follows:

1% retained on #65 mesh
1% retained on #80 mesh
14% retained on #100 mesh
84% through #100 mesh The stabilizer and lubricant paste comprised about:

2.07% dioctyl phthalate
36.08% Harshaw Chem. Co. 2-V-1 stabilizer (cadmium organic octyl hexyl phenyl phosphite complex)
24.05% Harshaw Chem. Co. 7-V-1 stabilizer (epoxy and chelating composition)
36.08% barium stearate
1.72% calcium silicate After milling, each polymer stock was sheeted off a laboratory calender at 0.017 gauge, placed on pieces of 2800 knit cotton fabric, heated, and embossed with a Hide roll on a laboratory paste coater. The polymer-coated fabrics were then washed in water containing about .05% by weight of a detergent, Triton X-100 (alkyl aryl polyether alcohol), to remove the softener and salt and to provide thin, flexible adherent laminates. The properties of the resulting laminates are shown in the table below:

Table

| Composition on fabric used | MVT, gms. $H_2O$/100 in.$^2$/24 hours | Appearance of coating | Feel of coating |
|---|---|---|---|
| "A" | 130 | Nonspecular | Leathery. |
| "B" | 140 | Shiny | Hard and slick. |
| "C" | 101 | do | Do. |
| "D" | 144 | do | Do. |

The Suter hydrostatic pressure of the above laminates varied from about 18 to 27 in. $H_2O$. The foregoing results show that the use of a softener, soluble in a nonsolvent for the plasticizer and polymer, will provide improvements in "slip" and "hand" of the resulting coating without a loss in its useful vapor permeability or water resistance. Moreover, while composition "B" also exhibited a shiny, hard and slick surface, it required about 30 minutes more milling time and a higher temperature and pressure when it was sheeted out into a film. Calendering composition "B" was more difficult than calendering the other composition.

In summary, the present invention teaches that thin, water-resistant, vapor-permeable films, sheets and laminates exhibiting excellent "hand" and "slip" can readily be prepared from compositions of polymers or copolymers of haloethylene compounds, a plasticizer, a minor amount of a softener for said polymer, soluble in a nonsolvent for the polymer and plasticizer, and a finely-divided nonhygroscopic pore-forming material also soluble in a nonsolvent for said polymer and plasticizer, and removing said softener and pore former from the fused or set plasticized polymer by treatment with a solvent which is a nonsolvent for the polymer and plasticizer. The novel products of the method of the present invention are smooth and can be embossed to simulate leather and materials of various kinds as well as certain novel weaves and other designs. They will find utility as upholstering material in furniture such as chairs, automobile seats, clothing, footwear and the like and especially where a breathable, water-resistant plastic coating or film having a hard, shiny or glossy and slick finish is desired.

What is claimed is:

1. The method which comprises mixing together to form a nonaqueous polymeric composition a polymer of a monomeric material in which each monomeric constituent contains a single olefinic double bond and in which the predominant monomer is a haloethylene having from 1 to 2 halogen atoms on only one carbon atom, a plasticizer for said polymer, a water-soluble softener for said polymer and from about 50 to 300% by weight based on the weight of the polymer of a solid, finely-divided, nonhygroscopic water-soluble pore-forming material, forming a relatively thin continuous fused layer of said composition and treating said layer with an aqueous solution to remove said softener and said nonhygroscopic material to provide a slick and shiny, vapor-permeable, water-resistant layer of said polymeric composition with improved hand and slip characteristics, said softener and said plasticizer being present in a total amount of from about 30 to 200 parts by weight per 100 parts by weight of said polymer and said softener being present in a minor amount as compared to said plasticizer.

2. In the method of making a breathable, water-resistant plastic material by mixing together a polymer of a monomeric material in which each monomeric constituent contains a single olefinic double bond and in which the predominant monomer is a haloethylene having from 1 to 2 halogen atoms on only one carbon atom, a plasticizer for said polymer, and from about 50 to 300% by weight based on the weight of said polymer of a finely-divided, solid, nonhygroscopic water-soluble, pore-forming material to form a nonaqueous composition, forming a continuous layer of said composition, fusing the resulting layer and treating the same with an aqueous solution to remove said nonhygroscopic material, the improvement comprising adding a water-soluble softener during said mixing step to at least one of said components of said composition and prior to fusing said composition, said softener and said plasticizer being present in a total amount of from about 30 to 200 parts by weight per 100 parts by weight of said polymer and said softener being present in a minor amount as compared to said plasticizer.

3. The method which comprises mixing together to form a nonaqueous polymeric composition a polymer of a monomeric material in which each monomeric constituent contains a single olefinic double bond and in which the predominant monomer is a haloethylene having from 1 to 2 halogen atoms on only one carbon atom, a softener selected from the class consisting of water-soluble alkylene carbonates and polyalkylene glycols, a plasticizer for said polymer and from about 50% to 300% by weight based on the weight of said polymeric material of a solid, powdered, nonhygroscopic water-soluble pore-forming material, forming a continuous, thin, flexible and adherent fused layer of said plastic composition on at least one side of a porous fabric base, and treating said fused layer with an aqueous solution to remove said softener and said powdered nonhygroscopic material from said plastic composition to provide a slick and shiny, vapor-permeable, water-resistant flexible polymeric coated laminate with improved slip and hand characteristics, said softener and said plasticizer being present in a total amount of from about 50 to 100 parts by weight per 100 parts by weight of said polymer and said softener being present in an amount of from about 5 to 30% by weight of the total amount of said softener and said plasticizer.

4. The method which comprises mixing together below gelling temperature to form a homogenous appearing nonaqueous composition a polymer of a monomeric material in which each monomeric constituent contains a single olefinic double bond and in which the predominant monomer is a haloethylene having from 1 to 2 halogen atoms on only one carbon atom, a plasticizer for said polymer to form a plastisol, a water-soluble softener for said polymer and from about 50 to 300% by weight based on the weight of said polymer of a solid, powdered, non-hygroscopic water-soluble pore-forming material, essentially all of the particles of said non-hygroscopic material passing through about a 65 mesh USS screen and a predominant amount of said particles passing through about 100 mesh USS screen, spreading the resulting composition as a continuous, relatively thin coating on at least one side of a porous fabric base, heating said coating to fuse the same, and washing the resulting laminate containing said fused coating with an aqueous solution to remove said softener and said nonhygroscopic material from said coating to obtain a laminate containing a water-resistant, vapor-permeable plasticized polymeric coating exhibiting improved hand and slip characteristics, said softener and said plasticizer being present in a total amount of from about 50 to 100 parts by weight per 100 parts by weight of said polymer and said softener being present in an amount of from about 5 to 30% by weight of the total amount of said softener and said plasticizer.

5. The method which comprises mixing together to form a homogenous appearing nonaqueous composition a polymer of a monomeric material in which each monomeric constituent contains a single olefinic double bond and in which the predominant monomer is a haloethylene having from 1 to 2 halogen atoms on only one carbon atom, a plasticizer for said polymer, a minor amount of a thickening agent to form a plastigel, a water-soluble softener for said polymer and from about 50 to 300% by weight based on the weight of said polymer of a powdered, nonhygroscopic, solid water-soluble pore-forming material, essentially all of the particles of said non-hygroscopic material passing through about a 65 mesh USS screen and a predominant amount of said particles passing through about a 100 mesh USS screen, spreading the resulting plastigel composition as a continuous, relatively thin coating on at least one side of a fabric base, heating said coating to fuse the same, and washing said base containing said fused coating with an aqueous solution to remove said softener and said nonhygroscopic material from said coating to provide a water-resistant, vapor-permeable plasticized polymeric coating exhibiting improved hand and slip characteristics, said softener and said plasticizer being present in a total amount of from about 50 to 100 parts by weight per 100 parts by weight of said polymer and said softener being present in an amount of from about 5 to 30% by weight of the total amount of said softener and said plasticizer.

6. The method which comprises mixing together to form a homogenous appearing nonaqueous composition a polymer of a monomeric material in which each monomeric constituent contains a single olefinic double bond and in which the predominant monomer is a haloethylene having from 1 to 2 halogen atoms on only one carbon atoms, a plasticizer for said polymer, from 10 to 50% by weight based on the weight of the polymer and plasticizer of a volatile organic diluent to form an organosol, a water-soluble softener for said polymer and from about 50 to 300% by weight based on the weight of the polymer of a solid, finely-divided, nonhygroscopic water-soluble pore-forming material, essentially all of the particles of said nonhygroscopic material passing through about a 65 mesh USS screen and a predominant amount of said particles passing through about a 100 mesh USS screen, forming a continuous, thin layer of the resulting composition on a porous fabric base, evaporating said diluent, fusing said layer, and washing said layer with an aqueous solution to remove said softener and said nonhygroscopic material from said composition to provide a vapor-permeable, water-resistant plasticized polymeric layer exhibiting improved hand and slip characteristics, said softener and said plasticizer being present in a total amount of from about 50 to 100 parts by weight per 100 parts by weight of said polymer and said softener being present in an amount of from about 5 to 30% by weight of the total amount of said softener and said plasticizer.

7. The method which comprises mixing together to form a homogenous appearing nonaqueous composition a polymer of a monomeric material in which each monomeric constituent contains a single olefinic double bond and in which the predominant monomer is a haloethylene having from 1 to 2 halogen atoms on only one carbon atom, a plasticizer to plasticize said polymeric material, a water-soluble softener for said polymer and from about 50 to 300% by weight based on the weight of said polymer of a powdered, nonhygroscopic, solid, water-soluble, pore-forming material, essentially all of the particles of said nonhygroscopic material passing through about a 65 mesh USS screen and a predominant amount of said particles passing through about a 100 mesh USS screen, calendering the resulting composition as a continuous, relatively thin coating on at least one side of a porous fabric base, fusing said coating, and treating said coating with an aqueous solution to remove said softener and said nonhygroscopic material from said coating to provide a water-resistant, vapor-permeable plasticized polymeric coating exhibiting improved hand and slip characteristics, said softener and said plasticizer being present in a total amount of from about 50 to 100 parts by weight per 100 parts by weight of said polymer and said softener being present in an amount of from about 5 to 30% by weight of the total amount of said softener and said plasticizer.

8. The method according to claim 7 in which said softener is ethylene carbonate.

9. The method according to claim 7 in which said softener is propylene carbonate.

10. The method according to claim 7 in which said softener is butylene carbonate.

11. The method according to claim 7 in which said softener is polyethylene glycol.

12. The method according to claim 7 in which said softener is polypropylene glycol.

References Cited in the file of this patent

UNITED STATES PATENTS

| | | |
|---|---|---|
| 1,953,083 | Lawson | Apr. 3, 1934 |
| 2,277,747 | Dreyfus | Mar. 31, 1942 |
| 2,474,201 | Raymond et al. | June 21, 1949 |
| 2,517,646 | Ewing | Aug. 8, 1950 |
| 2,542,527 | Honey et al. | Feb. 20, 1951 |
| 2,601,255 | Bruson | June 24, 1952 |
| 2,603,575 | Schramm | July 15, 1952 |
| 2,635,093 | Miller et al. | Apr. 14, 1953 |
| 2,673,825 | Biefeld | Mar. 30, 1954 |
| 2,697,664 | Goeser et al. | Dec. 21, 1954 |
| 2,698,816 | Dosmann et al. | Jan. 4, 1955 |
| 2,711,996 | Hofrichter | June 28, 1955 |
| 2,719,795 | Nottebohm | Oct. 4, 1955 |
| 2,721,150 | Grantham | Oct. 18, 1955 |
| 2,721,151 | Grantham | Oct. 18, 1955 |